United States Patent [19]
Watton et al.

[11] Patent Number: 5,582,841
[45] Date of Patent: Dec. 10, 1996

[54] FIBER MANUFACTURING SPINNER AND FIBERIZER

[75] Inventors: William A. Watton, Pickerington; James G. Snyder, Newark, both of Ohio

[73] Assignee: Owens Corning Fiberglas Technology, Inc., Summit, Ill.

[21] Appl. No.: 435,010

[22] Filed: May 4, 1995

[51] Int. Cl.$^6$ .............................. D01D 5/18; C03B 37/04
[52] U.S. Cl. .................. 425/8; 65/502; 65/516; 65/517; 264/8; 264/211.1; 425/72.2; 425/381.2
[58] Field of Search .................. 425/6, 7, 8, 72.2, 425/381.2; 264/8, 12, 13, 211.1; 65/502, 459, 470, 516, 517, 518, 522, 523

[56] References Cited

U.S. PATENT DOCUMENTS

| | | | |
|---|---|---|---|
| 2,984,864 | 5/1961 | Levecque et al. | 425/8 |
| 2,998,620 | 9/1961 | Stalego | 425/8 |
| 3,254,482 | 6/1966 | Stalego | 264/8 |
| 4,203,745 | 5/1980 | Battigelli et al. | 65/522 |
| 4,203,748 | 5/1980 | Battigelli et al. | 65/522 |
| 4,294,783 | 10/1981 | Snowden | 425/8 |
| 4,534,779 | 8/1985 | Herschler | 65/522 |
| 4,622,054 | 11/1986 | Huey et al. | 65/2 |
| 5,468,275 | 11/1995 | Lin et al. | 264/211.1 |
| 5,474,590 | 12/1995 | Lin | 425/8 |
| 5,482,527 | 1/1996 | Czastkiewicz | 65/502 |

*Primary Examiner*—Jay H. Woo
*Assistant Examiner*—Duane S. Smith
*Attorney, Agent, or Firm*—C. Michael Gegenheimer; Curtis B. Brueske

[57] ABSTRACT

A fiber manufacturing apparatus including a spinner, fixed to one end of a rotatable shaft and equipment for supplying at least one molten thermoplastic material to the spinner is provided. The spinner includes a radial wall and an outer peripheral wall. The radial wall extends radially out from the shaft and has an outer periphery. The peripheral wall is disposed around the outer periphery of the radial wall and has a plurality of orifices for centrifuging fibers from at least one molten thermoplastic material. The spinner is operatively adapted to be radially balanced during the centrifuging operation. By being so balanced, the spinner is less likely to exhibit temperature induced deformation that introduces undesirable process variables during the fiber manufacturing process.

20 Claims, 3 Drawing Sheets

FIBER MANUFACTURING SPINNER AND FIBERIZER

FIELD OF THE INVENTION

The present invention relates to an apparatus for manufacturing fibers from thermoplastic materials, more particularly to a fiberizer with a spinner for centrifuging single or multiple component fibers from molten thermoplastic materials such as glass or other minerals or polymers, and even more particularly to a radially balance spinner.

BACKGROUND OF THE INVENTION

Fibers of glass and other thermoplastic materials are useful in a variety of applications including acoustical or thermal insulation materials. Common prior art methods for producing glass fiber insulation products involve producing glass fibers from a rotary process. A single glass composition or multiple glass compositions are melted and forced through orifices in the outer peripheral wall of a centrifuge, known as a centrifugal spinner, to produce the fibers. One commonly used spinner is generally cup shaped with a bottom wall with a central hole, a top opening and an outer peripheral wall which curves upward from the bottom wall, forming the top opening. The lower end of a drive shaft, used to rotate the spinner, extends down through the top opening and is fixed to the center of the bottom wall with a quill. The central hole of the bottom wall is simply press-fit onto the outside diameter of the quill, and the quill is mounted to the lower end of the drive shaft.

The spinner becomes very hot during the fiber manufacturing process. Because of the high temperatures reached, the spinner walls are necessarily made from a high temperature resistant material, typically a high temperature metal alloy. Even so, at such high temperatures, the spinner exhibits a tendency to creep and sag downward as the spinner rotates. This deformation of the spinner can introduce process variables that adversely impact fiber production.

In addition, because it is simply press-fit on to the quill, the spinner has a tendency to loosen around the quill over time, due to thermal expansion, rotational stresses and creep to which the spinner and quill are subjected. As the fit loosens, the spinner moves off-center, resulting in a serious problem of excessive vibration and warping of the spinner. This problem becomes more pronounced as the size of the spinner, and thus the diameter of the central hole, increases.

Accordingly, there is a need for an improved spinner that is less likely to exhibit temperature induced deformation that introduces undesirable process variables during the fiber manufacturing process.

SUMMARY OF THE INVENTION

This need is met by the fiber manufacturing apparatus, often referred to as a fiberizer, of the present invention which includes a centrifuge, commonly known as a spinner, fixed to one end of a rotatable shaft and equipment for supplying at least one molten thermoplastic material to the spinner. The spinner includes a radial wall and an outer peripheral wall. The radial wall extends radially out from the shaft and has an outer periphery. The peripheral wall is disposed around the outer periphery of the radial wall and has a plurality of orifices for centrifuging fibers from at least one molten thermoplastic material. The spinner is operatively adapted to be substantially radially balanced during the centrifuging operation. That is, deformation of the radial wall and the peripheral wall during the centrifuging operation is substantially radial in nature rather than asymmetrical.

One feature of the spinner is a top opening through which a molten thermoplastic material is supplied to an upper surface of the radial wall. As the spinner rotates, centrifugal forces cause the molten material to flow radially outward across the upper surface of the radial wall, against the peripheral wall and through the fiber forming orifices. The spinner preferably includes an upper lip or other structure to insure that the molten material does not flow beyond the peripheral wall.

The spinner may be adapted in a number of ways to remain substantially radially balanced during centrifuging. For example, the peripheral wall may be adapted so that its mass is substantially the same both above and below the radial wall. Evenly distributing the mass of the peripheral wall above and below the radial wall can be accomplished in a number of ways. For example, the peripheral wall may be disposed around and joined to the outer periphery of the radial wall, and the peripheral wall can be made symmetrical above and below the radial wall. To maintain symmetry, it would therefore be desirable for the spinner to include a lower lip, or other structure of similarly distributed mass, disposed below the radial wall to counter balance the upper lip. Likewise, the spinner can include a bottom opening, disposed below the radial wall, formed by structure of similar mass and distribution to counterbalance the structure forming its top opening.

An apparatus according to the principles of the present invention can be adapted to centrifuge multiple component fibers as well as single component fibers and to make fibers from one or more molten thermoplastic materials. For example, one embodiment of the present fiber making apparatus includes a spinner with a radial wall having an upper surface, a dam disposed on the upper surface, a lower surface and at least one flow hole connecting the upper and lower surfaces of the radial wall, and preferably a plurality of such flow holes. Once deposited onto the upper surface of the radial wall, the molten thermoplastic material flows radially outward across the upper surface as the radial wall revolves. The dam is disposed and operatively adapted so as to direct one molten thermoplastic material through the at least one flow hole as the material flows radially outward across the upper surface. Once through a flow hole, the molten material flows radially outward across the lower surface of the radial wall, against the portion of the peripheral wall extending below the radial wall and through fiber forming orifices in the peripheral wall.

If two molten thermoplastic materials are used, one molten material can be deposited onto the upper surface of the radial wall radially before the dam and the other molten material can be deposited onto the upper surface radially beyond the dam. In this way, the one molten material flows radially outward across the upper surface of the radial wall, is directed through the at least one flow hole by the dam, flows radially outward across the lower surface of the radial wall and flows through fiber forming orifices in the peripheral wall. At the same time, the other molten material flows radially outward across the upper surface of the radial wall on its way to the peripheral wall. Depending upon the type of peripheral wall chosen for the spinner, the other molten material either flows through its own orifices to form single component fibers separate from those made from the one molten material or the two molten materials are channeled together into the same orifices to form multiple component fibers.

Because molten material can flow against the peripheral wall both above and below the radial wall when such a dam is used, having a lower lip as well as an upper lip is particularly desirable to insure that the molten material does not flow over and around the peripheral wall. It may also be desirable to use such a dam even when only one molten thermoplastic material is used. By allowing the molten thermoplastic material to flow radially across both the upper and lower surfaces of the radial wall, the overall mass added to the spinner by the molten material is more evenly distributed and has less of an effect on the radial balance of the spinner during the centrifuging process.

It is important for the inside of the spinner to remain at a temperature which allows the molten thermoplastic material to readily flow. Therefore, if the spinner has a bottom opening, it can be desirable to substantially cover the bottom opening with some form of a heat shield to help maintain the flow temperature in the spinner. The mass of the shield can be made to have little, if any, affect on the radial balance of the spinner by making the shield a separate element from the radial wall and outer peripheral wall.

Hot air is often used to melt the thermoplastic material and keep it in its molten state until the fibers are formed. The flow of hot air over the top and bottom of the peripheral wall can be used to control the temperature distribution over the peripheral wall. A gap is preferably formed between the shield and peripheral wall of the spinner to allow hot air to flow over the bottom of the peripheral wall and ensure that all the thermoplastic material located in the peripheral wall remains molten.

In another embodiment, the present fiber making apparatus includes a hub mounted at one end of, and for rotation with, its shaft. The hub is operatively adapted for mounting the radial wall of the spinner so as to allow the radial wall to be readily fixed to and removed from the shaft. For a spinner having a bottom opening covered by a heat shield, the hub can be adapted to also retain the shield. For example, if the shield has a central hole formed therethrough, the hub can include a circular shoulder on which the shield sits when the hub is disposed through the central hole. By separately mounting the shield to the hub, the radial wall and peripheral wall of the spinner can remain radially balanced independent of how the shield deforms during centrifuging.

The hub can mount the spinner to the end of the rotatable shaft by forming a central hole through the radial wall and disposing the hub through the central hole. Being subjected to high temperatures while in use, the central hole of the radial wall tends to increase in diameter over time relative to the hub, due to thermal expansion, rotational stresses and creep. If its central hole is allowed to so expand, the spinner may move off-center from the rotating shaft, resulting in excessive vibration and warping. This problem becomes more pronounced as the size of the spinner, and thus the diameter of the central hole, increases. Therefore, the spinner is preferably mounted on the hub so as to prevent the central hole of the radial wall from expanding an appreciable amount away from the hub. One way of preventing this separation between the hub and the radial wall is for the radial wall to include at least one flange that at least partially defines the central hole. This flange is then secured in a corresponding groove formed in the hub.

The problem of temperature induced asymmetrical (i.e., nonradial) deformation is expected to become more pronounced for prior art spinners as the outer diameter of the spinner increases, especially for spinners having an outer diameter of at least about 12 inches (about 30.5 cm) or more. Such deformation is also expected to increase when the mass at the outer peripheral wall area of the spinner increases, as is often the case with outer peripheral walls adapted for making multiple component fibers. In both instances, the increase in asymmetrical deformation is due in large part to a resulting increase in moment forces acting downward at the outer periphery of the spinner. The principles of the present invention enable such detrimental deformation to be substantially limited, if not eliminated, even for large diameter spinners and those designed to make multiple component fibers.

The objectives, features, and advantages of the present invention will become apparent upon consideration of the description herein and the appended claims and drawings.

DETAILED DESCRIPTION OF THE INVENTION

Although the present invention is herein described in terms of a specific embodiment, it will be readily apparent to those skilled in this art that various modifications, rearrangements, and substitutions can be made without departing from the spirit of the invention. The scope of the present invention is thus only limited by the claims appended hereto.

Figure 1:
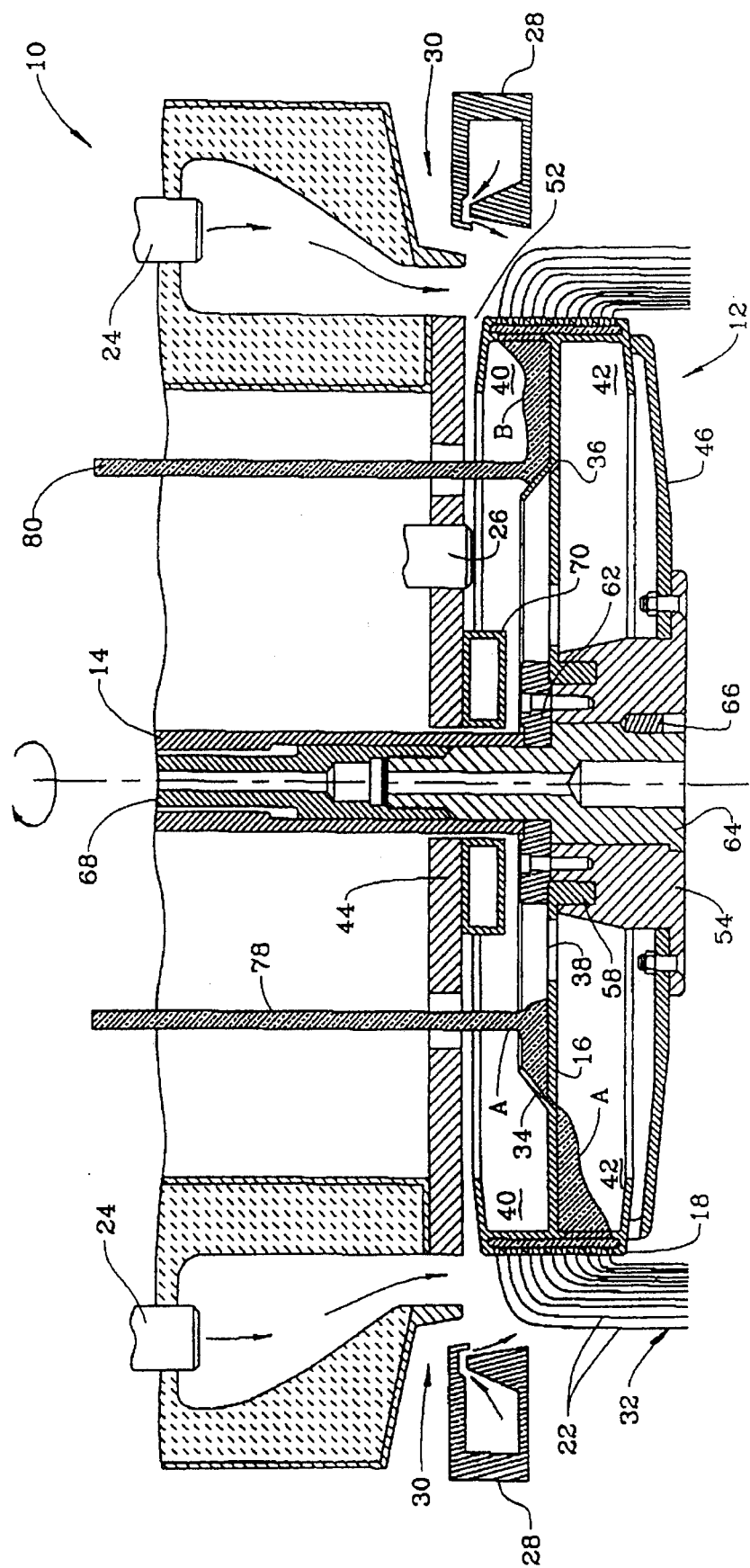
FIG. 1 is a partially schematic cross-sectional view in elevation of a fiberizer with a spinner according to the principles of the present invention.
Figure 2:
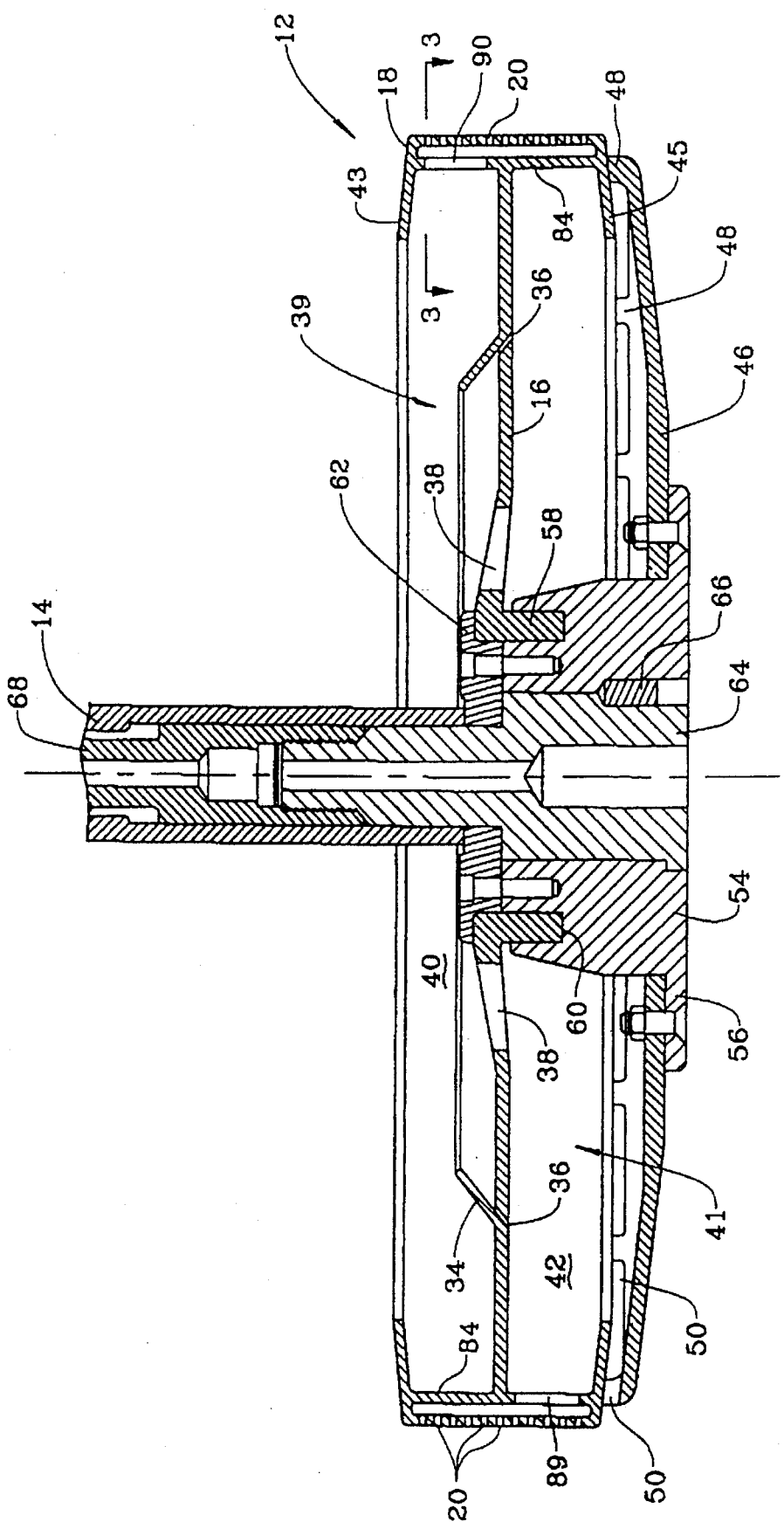
FIG. 2 is a cross-sectional view in elevation of an alternative embodiment of the spinner of FIG. 1, mounted at the end of the spindle.

Referring to FIGS. 1 and 2, a fiber manufacturing apparatus or fiberizer 10 includes a centrifuge or spinner 12 fixed to the lower end of a rotatable hollow shaft or spindle 14. The spinner 12 is rotated by rotating spindle 14, as is known in the art. The spinner 12 includes a radial wall 16 that extends radially out from the spindle 14 and has an outer periphery. FIGS. 1 and 2 show two alternative embodiments for the radial wall 16. Both of these embodiments are designated by the same reference numeral 16. An outer peripheral wall 18 is disposed around the outer periphery of the radial wall 16 and has a plurality of orifices 20 for centrifuging fibers 22 of a molten thermoplastic material, for example glass.

The rotation of the spinner 12 (as depicted by the circular arrow in FIG. 1) centrifuges molten glass through orifices 20 in spinner peripheral wall 18 to form primary fibers 22. The primary fibers 22 are maintained in a soft, attenuable condition by the heat of an annular burner 24. A plurality of internal burners 26 are circumferentially disposed around spindle 14 and used to heat the interior of spinner 12 to prevent the molten thermoplastic material from solidifying or devitrifying before being formed into fibers. An annular blower 28, using induced air through passage 30, is positioned to pull primary fibers 22 and further attenuate them into secondary fibers 32, suitable for use in a product, such as wool insulating materials. The secondary fibers 32 are then collected on a conveyor (not shown) for formation into a product, such as a glass wool pack.

Because it is used to form multiple component fibers 32, the spinner 12 has an integrally formed circular dam 34 extending up from the upper surface of radial wall 16 and angling back toward the axis of rotation of spindle 14. A plurality of circumferentially spaced flow holes 36 are formed through radial wall 16, connecting its upper and lower surfaces. Each flow hole 36 is formed through radial wall 16 just on the inside of dam 34 at an acute angle to wall 16. Dam 34 is formed at a similar acute angle to radial wall 16. A plurality of gas vent holes 38 are formed through radial wall 16 to provide paths for the hot exhaust gases from the internal burners 26 to flow through radial wall 16. These hot gases flow from burners 26, through a top opening 39 formed by an upper annular lip 43 and into an upper chamber 40 of spinner 12 formed above radial wall 16. The hot gases then flow through the vent holes 38, into a lower chamber 42 formed below radial wall 16 and through a bottom opening 41 formed by a lower annular lip 45. The spinner 12 is open at its top and bottom, at least in part, so that it is radially balanced during the centrifuging of fibers.

It is important for the upper and lower chambers 40 and 42 of the spinner 12 to remain at a temperature which allows the molten thermoplastic material to readily flow. Therefore, a portion 44 of the fiberizer 10, typically a bottom center casing, directly above the spinner 12 is operatively adapted to substantially cover the top opening 39 of spinner 12. A circular plate or radiation shield 46 is used to substantially cover the bottom opening 41 of spinner 12. In this way, the desired high temperature can be maintained inside spinner 12. A plurality of circumferentially separated spacers 48 are preferably formed along the outer periphery of shield 46. These spacers 48 maintain the shield 46 a minimum distance from the spinner 12.

The lower corner of the peripheral wall of some prior art spinners have experienced cooling problems, resulting in the thermoplastic material solidifying prematurely. This undesirable cooling is believed to be caused by insufficient circulation of the hot gas in the spinner's lower chamber. Allowing the hot gas to flow out of the lower chamber 42 has solved this problem. Thus, a plurality of gaps 50 are formed around the outer periphery of shield 46, one gap 50 between any two adjacent spacers 48. These gaps 50 provide a path for the exhaust gases from the burners 26 to flow through and exit out of lower chamber 42, improving the circulation and flow of the gases through the spinner.

Exhaust gases entering the upper chamber 40 from burners 26 are also able to flow through and out of the upper chamber 40 through a space 52 formed between the spinner 12 and the housing portion 44. In this way, hot exhaust gases from burners 26 are able to circulate adjacent to the top and bottom of the peripheral wall 18, thereby controlling the temperature profile over the entire spinner wall 18. Maintaining a more uniform temperature profile throughout the interior of spinner 12 helps to ensure that the thermoplastic material remains sufficiently molten to properly flow at the bottom as well as the top of peripheral wall 18 and through orifices 20.

The heat shield 46 is a separate element from the radial wall 16 and peripheral wall 18 so that the mass of shield 46 has little, if any, effect on the radial balance of the spinner 12. Both the radial wall 16 of spinner 12 and the heat shield 46 are mounted on a hub 54. The hub 54 is mounted for rotation with the lower end of spindle 14. Hub 54 includes a lower circular shoulder 56, upon which the shield 46 rests and, preferably, is bolted. The radial wall 16 includes a circular flange 58 which is seated in a matching circular groove 60 formed in the top of the hub 54. A circular clamping plate 62 is bolted onto the top of hub 54 and over radial wall 16 so as to secure flange 58 in groove 60.

A hollow quill 64 is press fit in a bore hole formed through the center of hub 54 and locked in place with three circumferentially spaced locking pins 66. The upper end of the quill 64 is threaded into the lower end of a hollow drawbar 68. The drawbar 68 is spring loaded at the upper end of spindle 14 to draw plate 62, along with quill 64 and hub 54, up against the lower end of spindle 14. The quill 64 is partially cooled by circulating cooling air through a stepped bore formed through the drawbar 68 and into another stepped bore formed through the quill 64. The quill 64 is preferably cooled further with water circulated through an annular cooling jacket 70 disposed around spindle 14 and quill 64 and above hub 54. The quill 64 and hub 54 are each fabricated from a low thermal expansion alloy to minimize differential thermal expansion between them.

It is important to maintain the concentric relationship between the spinner 12 and the spindle 14. Allowing the spinner to move off-center while centrifuging can cause excessive vibration and warping of the spinner. This has posed a serious problem with prior fiberizers. Therefore, the present invention preferably includes structure for keeping the spinner 12 centered on the hub 54 and quill 64. For example, one way of keeping the spinner 12 centered includes adapting the outside diameter of the spinner flange 58 to snugly fit against the inside surface of the hub groove 60. With the quill 64 and hub 54 being made of low thermal expansion material and cooled as previously described, the spinner flange 58 forms a tighter fit against the inside surface of the groove 60 as flange 58 grows due to thermal expansion, rotational stresses and/or creep.

During the operation of the fiberizer 10, the radial wall 16 may become susceptible to thermal expansion cracking at the vent holes 38. To prevent such premature cracking of the radial wall 16, it may become desirable to emboss or otherwise increase the thickness of the radial wall 16 in the area surrounding each vent hole 38. As another option, it may be desirable to change the shape of each vent hole 38 so as to less of a stress concentrator. For example, each vent hole 38 could be made oval in shape, instead of circular, with the major axis of each oval hole being oriented to curve in a circumferential manner around the spinner flange 58. Alternatively, if necessary, each vent hole 38 can be modified both by being made oval in shape and by embossing the area around each hole 38.

The interior of spinner 12 is supplied with two separate streams of molten glass, a first stream 78 containing glass A and a second stream 80 containing glass B. The glass in both streams 78 and 80 drops directly onto the upper surface of spinner radial wall 16 and flows outwardly due to the centrifugal force toward spinner peripheral wall 18. Glass A in molten glass stream 78 is positioned radially closer to spindle 14 and lands inside of dam 34. A build-up or head of Glass A is first formed against dam 34. Glass A then flows through the various holes 36, from the upper side to the underside of radial wall 16. Flow holes 36 are sized and numbered to ensure that glass A does not escape over dam 34. Glass A continues to flow along the underside of wall 16 and towards peripheral wall 18, as shown. Glass B in molten glass stream 80 is positioned radially further from spindle 14 and lands outside of dam 34. Glass B then flows directly toward peripheral wall 18, as shown. Streams 78 and 80 can be disposed adjacent one another on the same side of spindle 14 but are preferably disposed to drop glasses A and B on opposite sides of spinner 12, as shown.

Figure 3:
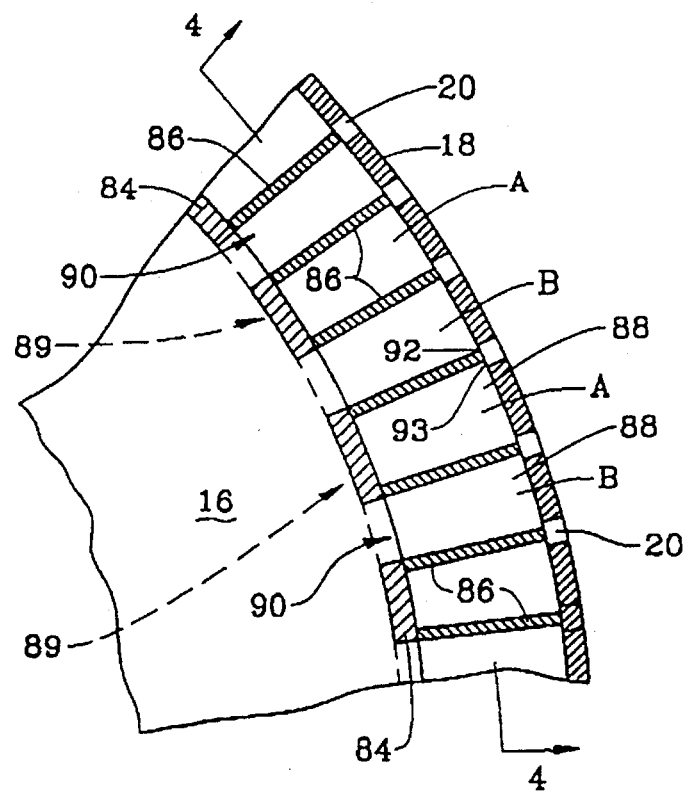
FIG. 3 is a plan view of a portion of the spinner of FIG. 2, taken along line 3—3.

As best shown in FIG. 3, the spinner 12 is adapted with a vertical interior wall 84 which is generally circumferential and positioned radially inwardly from the spinner peripheral wall 18. As they flow toward peripheral wall 18, glasses A and B build-up against interior wall 84, above and below radial wall 16, respectively. The upper and lower annular lips 43 and 45 help to insure that the molten material does not flow around interior wall 84 and beyond the peripheral wall 18 (see FIG. 1). A series of vertical baffles 86, positioned between spinner peripheral wall 18 and vertical interior wall 84, divide that space into a series of generally vertically-aligned compartments 88 which run substantially the entire height of spinner peripheral wall 18. Alternate compartments contain glass A and glass B which flow, respectively, into compartments 88 through slots 89 and 90 (see FIG. 1) formed in interior wall 84. It can be seen that radial wall 16, vertical interior wall 84, and baffles 86 together comprise a divider for directing glasses A and B into alternating adjacent compartments 88, respectively through slots 89 and 90, so that every other compartment contains glass A while the remaining compartments contain glass B.

Figure 4:
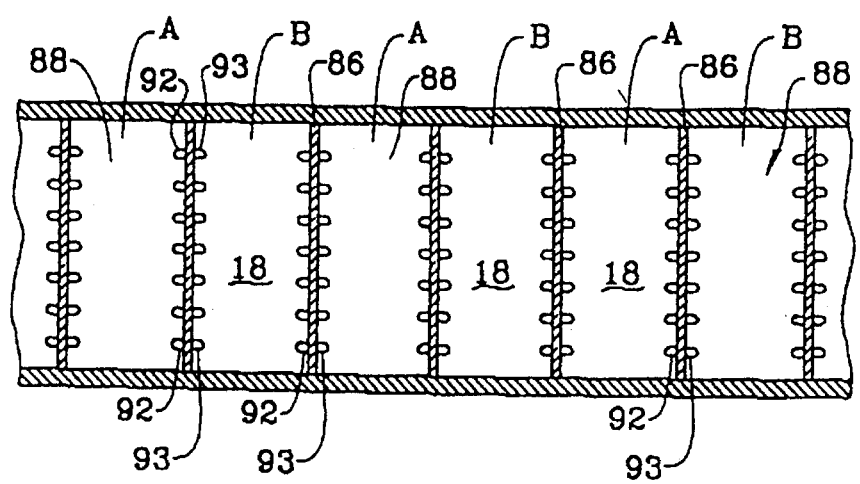
FIG. 4 is a cross-sectional view in elevation of the spinner of FIG. 3, taken along line 4—4.

The orifices 20 on spinner peripheral wall 18 are each positioned adjacent to, and in general alignment with, the radial outward edges of the vertical baffles 86. As can been seen in FIG. 4, a series of passages 92 and 93 are located in each of the compartments 88 through which molten thermoplastic material will flow. Preferably, these passages are located adjacent either side of baffles 86 and communicate with orifices 20 on the outer surface of peripheral wall 18.

As shown, the passages 92 and 93 are generally vertically aligned and are preferably sized to provide equal flow lengths for the A and B glass components in adjacent compartments 88. This ensures that when the A and B components exit orifices 20 in side-by-side relation, there will be approximately equal amounts of A and B glasses for each fiber. It will be recognized that if unequal amounts of A and B glasses are desired, the passages 92 and 93 may be sized to provide for unequal amounts of flow resulting in unequal proportions in the dual component fiber. Such a result may be desirable in certain instances. Additionally, the passages in each compartment may be modified to provide a variation in the ratios and configuration of A and B glasses in the dual component fibers formed. The number of passages formed depends on the height of the spinner peripheral wall 18. The number and size of the passages, as well as the flow rate of the molten glasses into compartments 88, is chosen to build up a "head" of molten material covering the passages in each compartment.

From the above disclosure of the general principles of the present invention and the preceding detailed description, those skilled in this art will readily comprehend the various modifications to which the present invention is susceptible. For example, while the embodiment described in detail above is adapted for making dual-component fibers, the present invention is also intended to be used with embodiments adapted form making single component fibers. Therefore, the scope of the invention should be limited only by the following claims and equivalents thereof.

We claim:

1. A radially balanced spinner adapted to be fixed at one end of a rotatable shaft in a fiberizer, said spinner comprising:

a radial wall extending out from the shaft and having an outer periphery; and an outer peripheral wall with a plurality of orifices for centrifuging fibers from at least one molten thermoplastic material, said peripheral wall being disposed around and joined to the outer periphery of said radial wall, wherein said spinner includes an upper lip and a lower lip, and said radial wall is disposed between said upper lip and said lower lip.

2. The spinner of claim 1, wherein said upper and lower lip extend from said peripheral wall radially back toward the rotatable shaft.

3. The spinner of claim 1, wherein said peripheral wall has a mass and the mass of said peripheral wall is substantially the same above and below said radial wall.

4. The spinner of claim 1, wherein said spinner has a top opening and a bottom opening respectively disposed above and below said radial wall, and said spinner includes a shield adapted and disposed to substantially cover said bottom opening.

5. The spinner of claim 1, wherein said radial wall has an upper surface, a dam disposed on said upper surface, a lower surface and at least one flow hole connecting said upper surface to said lower surface, said dam being operatively adapted for directing one molten thermoplastic material, deposited on said upper surface radially before said dam, through said at least one flow hole on its way to said orifices as said spinner is rotated.

6. An apparatus for making fibers comprising:

a spinner fixed at one end of a rotatable shaft, said spinner including a top opening, a bottom opening, a radial wall positioned therebetween and an outer peripheral wall with a plurality of orifices for centrifuging fibers from at least one molten thermoplastic material, said radial wall extending radially out from said shaft and having an outer periphery, said peripheral wall having a mass substantially the same above and below said radial wall and being disposed around the outer periphery of said radial wall, and said spinner being operatively adapted to be radially balanced during said centrifuging; and equipment for supplying at least one molten thermoplastic material to said spinner through said top opening.

7. The apparatus of claim 6, wherein said spinner includes a circumferential upper lip and lower lip, each lip extends from said peripheral wall radially toward said rotatable shaft, and said radial wall is disposed between said upper lip and said lower lip.

8. The apparatus of claim 6, wherein said peripheral wall is symmetrical above and below said radial wall.

9. The apparatus of claim 6, further comprising a separate shield adapted and disposed to substantially cover the bottom opening of said spinner.

10. The apparatus of claim 9, further comprising a hub mounted at the one end of said shaft, wherein said hub has a shoulder and said shield has a central hole formed therethrough, said hub is disposed through said central hole, and said shield is seated on the shoulder of said hub.

11. The apparatus of claim 6, further comprising a hub mounted at the one end of said shaft, wherein said radial wall is mounted to said hub and said hub is operatively adapted for allowing said radial wall to be readily fixed to and removed from said shaft.

12. The apparatus of claim 6, further comprising a hub mounted at the one end of said shaft, wherein a central hole is formed through said radial wall, said hub is disposed through said central hole, and said radial wall is mounted on said hub so as to prevent said central hole from expanding an appreciable amount away from said hub.

13. The apparatus of claim 12, wherein said radial wall includes at least one flange that at least partially defines said central hole and said hub includes at least one groove in which said flange is secured.

14. The apparatus of claim 6, wherein said equipment deposits at least one molten thermoplastic material onto said radial wall of said spinner through said top opening.

15. The apparatus of claim 6, wherein said radial wall has an upper surface, a dam disposed on said upper surface, a lower surface and at least one flow hole connecting said upper surface to said lower surface, said at least one flow hole is disposed radially before said dam, said equipment deposits one molten thermoplastic material onto said upper surface radially before said dam and another molten thermoplastic material onto said upper surface radially beyond said dam, and said dam is operatively adapted for directing said one molten thermoplastic material through said at least one flow hole as said one molten thermoplastic material flows radially outward across the upper surface of said radial wall on its way to said orifices.

16. An apparatus for making fibers comprising:
a spinner fixed at one end of a rotatable shaft, said spinner comprising:
a top opening, a bottom opening and a radial wall positioned therebetween, the one end of said shaft extending down through said top opening and said radial wall extending radially out from said shaft and having a circular outer periphery,
an outer peripheral wall having a mass, a circumferential upper lip and lower lip, and a plurality of orifices for centrifuging fibers from at least one molten thermoplastic material, said peripheral wall being disposed around the outer circumferential periphery of said radial wall, with said radial wall being disposed between said upper lip and said lower lip such that the mass of said peripheral wall is substantially the same above and below said radial wall, and each lip extending from said peripheral wall radially toward said rotatable shaft; and
equipment for supplying at least one molten thermoplastic material to said spinner through said top opening.

17. The apparatus of claim 16, further comprising a hub mounted at the one end of said shaft and a separate shield adapted and disposed to substantially cover the bottom opening of said spinner, wherein said hub has a circular groove formed therein and a lower shoulder, said radial wall has a first central hole defined by a circular flange, said shield is disk shaped with a second central hole formed therethrough, said hub is disposed through said central hole with said circular flange being secured in said circular groove and said shield being seated on said lower shoulder, and said hub is operatively adapted for allowing said radial wall and said shield to be readily attached to and removed from said hub.

18. The apparatus of claim 16, wherein said equipment supplies at least one molten thermoplastic material onto said radial wall of said spinner through said top opening and said peripheral wall is operatively adapted so as to centrifuge fibers from a plurality of molten thermoplastic materials.

19. The apparatus of claim 16, wherein said radial wall has an upper surface, a circular dam disposed on said upper surface, a lower surface and a plurality of flow holes connecting said upper surface to said lower surface, said flow holes are disposed radially before said dam, said equipment deposits one molten thermoplastic material onto said upper surface radially before said dam and another molten thermoplastic material onto said upper surface radially beyond said dam, and said dam is operatively adapted for directing said one molten thermoplastic material through said flow holes as said one molten thermoplastic material flows radially outward across the upper surface of said radial wall on its way to said orifices.

20. The apparatus of claim 16, wherein said spinner has an outer diameter of at least about 12 inches (30.5 cm).

* * * * *